(12) United States Patent
Aoki et al.

(10) Patent No.: US 7,523,849 B2
(45) Date of Patent: Apr. 28, 2009

(54) ULTRASONIC WELDING METHOD, ULTRASONIC WELDING DEVICE AND PIPE JOINED BY THE SAME

(75) Inventors: Yuuichi Aoki, Chita-gun (JP); Yoshihiko Matsusaka, Anjo (JP); Hiroyasu Morikawa, Nagoya (JP); Arinori Shimizu, Nishio (JP); Hirokazu Hashimoto, Anjo (JP)

(73) Assignee: Denso Corporation, Kariya (JP)

( * ) Notice: Subject to any disclaimer, the term of this patent is extended or adjusted under 35 U.S.C. 154(b) by 151 days.

(21) Appl. No.: 11/725,536

(22) Filed: Mar. 19, 2007

(65) Prior Publication Data

US 2007/0221709 A1  Sep. 27, 2007

(30) Foreign Application Priority Data

Mar. 22, 2006  (JP) .............................. 2006-079152

(51) Int. Cl.
  *B23K 1/06*  (2006.01)
  *B29C 65/00*  (2006.01)
(52) U.S. Cl. .................................. 228/110.1; 156/73.1
(58) Field of Classification Search ... 228/110.1–111.5, 228/1.1; 156/358, 580.1, 64, 73.1–73.4
See application file for complete search history.

(56) References Cited

U.S. PATENT DOCUMENTS

| | | | | |
|---|---|---|---|---|
| 3,257,721 A | * | 6/1966 | Jones | 228/1.1 |
| 3,319,984 A | * | 5/1967 | Jones et al. | 403/265 |
| 3,521,348 A | * | 7/1970 | Jones et al. | 29/428 |
| 3,581,969 A | * | 6/1971 | Bodine | 228/1.1 |
| 3,657,802 A | * | 4/1972 | Delmas | 228/111 |
| 4,729,778 A | * | 3/1988 | Griffin | 65/36 |
| 4,746,025 A | * | 5/1988 | Krautkramer et al. | 215/232 |
| 4,842,671 A | * | 6/1989 | Nuss | 156/433 |
| 5,697,545 A | * | 12/1997 | Jennings et al. | 228/112.1 |
| 5,699,950 A | * | 12/1997 | Jang | 228/1.1 |

(Continued)

FOREIGN PATENT DOCUMENTS

JP  59178215 A  * 10/1984

(Continued)

OTHER PUBLICATIONS

U.S. Appl. No. 11/725,540, filed Mar. 19, 2007, Shimizu et al.

*Primary Examiner*—Jessica L Ward
*Assistant Examiner*—Carlos Gamino
(74) *Attorney, Agent, or Firm*—Harness, Dickey & Pierce, PLC

(57) ABSTRACT

An ultrasonic welding method and an ultrasonic welding device are provided to join a first member having a substantial pipe shape and a second member at a joining surface by pressure-applying and vibration-exciting. In an arranging process, each of a first horn member and a second horn member is slantways arranged in such a manner that a part of a pressure-applying surface thereof which is nearer to a division surface thereof becomes nearer to the joining surface, according to deformation in a joining process. Thus, in the joining process, the pressure-applying surfaces are disposed substantially parallel to the joining surface due to a pressure-applying reaction force, so that the first horn member and the second horn member can be pressed against each other at the division surfaces thereof.

12 Claims, 9 Drawing Sheets

U.S. PATENT DOCUMENTS

| | | | | |
|---|---|---|---|---|
| 6,032,835 A | * | 3/2000 | Burt | 222/402.1 |
| 6,202,915 B1 | * | 3/2001 | Sato | 228/110.1 |
| 6,320,181 B1 | * | 11/2001 | Noji et al. | 250/214 VT |
| 6,357,506 B1 | * | 3/2002 | Nomura et al. | 156/580 |
| 7,344,616 B2 | * | 3/2008 | Sorensen | 156/228 |
| 7,445,140 B2 | * | 11/2008 | Aoki et al. | 228/110.1 |
| 2007/0228107 A1 | * | 10/2007 | Shimizu et al. | 228/110.1 |

FOREIGN PATENT DOCUMENTS

| | | |
|---|---|---|
| JP | 2000-229265 | 8/2000 |
| JP | 2001-246479 | 9/2001 |

\* cited by examiner

PRESSURE-APPLYING REACTION FORCE

PRESSURE-APPLYING
REACTION FORCE

ULTRASONIC WELDING METHOD, ULTRASONIC WELDING DEVICE AND PIPE JOINED BY THE SAME

CROSS REFERENCE TO RELATED APPLICATION

This application is based on a Japanese Patent Application No. 2006-79152 filed on Mar. 22, 2006, the disclosure of which is incorporated herein by reference.

FIELD OF THE INVENTION

The present invention relates to an ultrasonic welding method, an ultrasonic welding device, and a pipe joined by the same.

BACKGROUND OF THE INVENTION

Generally, for example, as disclosed in JP-2001-246479A, an ultrasound joining method is provided to join two metal-made members. In this case, for example, the first member is constructed of a pipe (linear pipe) which has a flange portion at the one end side thereof. The second member is constructed of a wall surface of a header tank of a heat exchanger, for example.

The pipe (flange portion) is vibration-excited by a horn while being pressure-applied toward the side of the heat exchanger (wall surface of header tank) at a predetermined pressure, in such a state that the heat exchanger is fixed at an anvil. Thus, a friction is caused between the two members so that oxidation film of the two members is destroyed. In this case, clean contact surfaces of the two members which are emerging surfaces are extremely near to each other, so that the function among atoms occurs between the two members. Therefore, the flange portion is pressurized and joined to the wall surface of the header tank, due to the friction heat occurred at the contact surfaces of the two members and the function among atoms.

In this case, the horn contacts an outer surface (which is opposite to the side of heat exchanger) of the flange portion of the pipe, and has a cylindrical shape to cover the periphery of the pipe. As disclosed in JP-2001-246479A, the horn is set from the opposite side of the pipe (liner pipe) to the flange portion thereof.

However, according to the joining method disclosed in JP-2001-246479A, it is difficult to set the horn from the opposite side of the pipe to the flange portion in the case where the pipe has a bent portion or an overhang portion at the opposite side of the pipe to the flange portion.

SUMMARY OF THE INVENTION

In view of the above-described disadvantage, it is an object of the present invention to provide an ultrasonic welding method and an ultrasonic welding device in which a horn unit is readily set with a satisfactory vibration-transferring efficiency, and a pipe joined by the same.

According to a first aspect of the present invention, an ultrasonic welding method is provided. The ultrasonic welding method includes an arranging process and a joining process. In the arranging process, a horn unit is arranged at an opposite side of a flange portion of a first member to a second member. The flange portion is positioned at an end of the first member. The horn unit is constructed of a first horn member and a second horn member which are separate from each other in a circumferential direction of the flange portion at division surfaces of the first horn member and the second horn member. The joining process is performed to vibration-excite the flange portion while pressurizing the flange portion toward an end portion of the second member at pressure-applying surfaces of the first horn member and the second horn member, so that the flange portion of the first member is joined to the end portion of the second member at a joining surface. The joining process is performed in such a state that the first horn member and the second horn member are pressed against each other at the division surfaces thereof. In the arranging process, each of the first horn member and the second horn member is slantways arranged, in such a manner that a part of the pressure-applying surface thereof which is nearer to the division surface thereof becomes nearer to the joining surface. In the joining process, the pressure-applying surfaces of the first horn member and the second horn member are disposed to be substantially parallel to the joining surface due to a pressure-applying reaction force, and a vibration of the first horn member is transferred to the second horn member through the division surfaces which are pressed against each other.

In this case, in the joining process, the pressure-applying surfaces of the first horn member and the second horn member can become substantially parallel to the joining surface due to the pressure-applying reaction force. Therefore, in the joining process, the first horn member and the second horn member can be pressed against each other at the division surfaces thereof. Accordingly, the vibration from the first horn member can be efficiently transferred to the second horn member.

Moreover, because the horn unit is constructed of the first horn member and the second horn member which are separate from each other in the circumferential direction of the flange portion at the division surfaces, the horn unit can be readily set to the first member having a bent portion or/and an overhang portion.

According to a second aspect of the present invention, an ultrasonic welding method includes an arranging process and a joining process. In the arranging process, a horn unit is arranged at an opposite side of a flange portion of a first member to a second member. The flange portion is positioned at an end of the first member. The horn unit includes a first horn member and a second horn member which are separate from each other in a circumferential direction of the flange portion at division surfaces of the first horn member and a second horn member. The joining process is performed to vibration-excite the flange portion while pressurizing the flange portion toward an end portion of the second member at pressure-applying surfaces of the first horn member and the second horn member, so that the flange portion of the first member is joined to the end portion of the second member at a joining surface. The joining process is performed in such a state that the first horn member and the second horn member are pressed against each other at the division surfaces thereof. At least one of the first horn member and the second horn member of the horn unit includes a body portion and a soft portion which has a lower hardness than the body portion and is arranged at a side of the division surface thereof. The soft portion is detachably mounted to the body portion. In the joining process, a vibration of the first horn member is transferred to the second horn member through the division surfaces which are pressed against each other.

Thus, when the second horn member vibrates (e.g., resonates) due to the vibration transferred from the first horn member through the division surfaces, the soft member can be worn in the case where there occurs wear at the division surface. Therefore, wear of the components other than the soft member can be restricted. Because the soft member is detachably mounted to the body member, the replacement of the soft member can be readily performed.

According to a third aspect of the present invention, an ultrasonic welding device for joining a first member and a second member is provided. The ultrasonic welding device has a horn for vibration-exciting a flange portion of the first member while pressurizing the flange portion toward an end portion of the second member at pressure-applying surfaces of the horn unit so that the flange portion is joined to the end portion at a joining surface. The flange portion is positioned at an end of the first member. The horn unit has a first horn member and a second horn member which are respectively separate from each other in a circumferential direction of the flange portion at division surfaces thereof. The pressure-applying surfaces are respectively arranged at the first horn member and the second horn member. At least one of the first horn member and the second horn member of the horn unit includes a body portion and a soft portion which has a lower hardness than the body portion and is arranged at a side of the division surface thereof. The soft portion is detachably mounted to the body portion. The second horn member is capable of resonating due to a vibration of the first horn member through the division surfaces, when the first horn member and the second horn member are pressed against each other at the division surfaces thereof.

Thus, the above-described ultrasonic welding method can be performed.

According to a fourth aspect of the present invention, a joined pipe has a pipe-shaped portion, and a flange portion which is arranged at an end of the pipe-shaped portion. The flange portion is pressurized and vibration-excited by a horn unit at pressure-applying surfaces of the horn unit, to be joined to an object member at a joining surface. The horn unit has a first horn member and a second horn member which are separate from each other in a circumferential direction of the flange portion at division surfaces thereof. The pressure-applying surfaces are respectively arranged at the first horn member and the second horn member. Before pressurizing the flange portion, each of the pressure-applying surfaces is slantways arranged in such a manner that a part of the pressure-applying surface which is nearer to the division surface thereof is nearer to the joining surface. When pressurizing the flange portion, each of the pressure-applying surfaces is substantially parallel to the joining surface due to a pressure-applying reaction force.

Thus, the flange portion of the pipe can be substantially joined to the object member.

According to a fifth aspect of the present invention, a joined pipe has a pipe-shaped portion, and a flange portion which is arranged at an end of the pipe-shaped portion. The flange portion is pressurized and vibration-excited by a horn unit, to be joined to an object member at a joining surface. The horn unit has a first horn member and a second horn member which are separate from each other in a circumferential direction of the flange portion at division surfaces thereof. At least one of the first horn member and the second horn member includes a body portion and a soft portion which has a lower hardness than the body portion and is arranged at a side of the division surface thereof. The soft portion is detachably mounted to the body portion.

In this case, wear of the components other than the soft member can be restricted, even when the manufacture for the joined pipe is repeated. Moreover, the horn unit can readily recover, when the soft member is worn. Therefore, the flange portion can be stably joined to the object member.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE EXAMPLED EMBODIMENTS

First Embodiment

Figure 1:
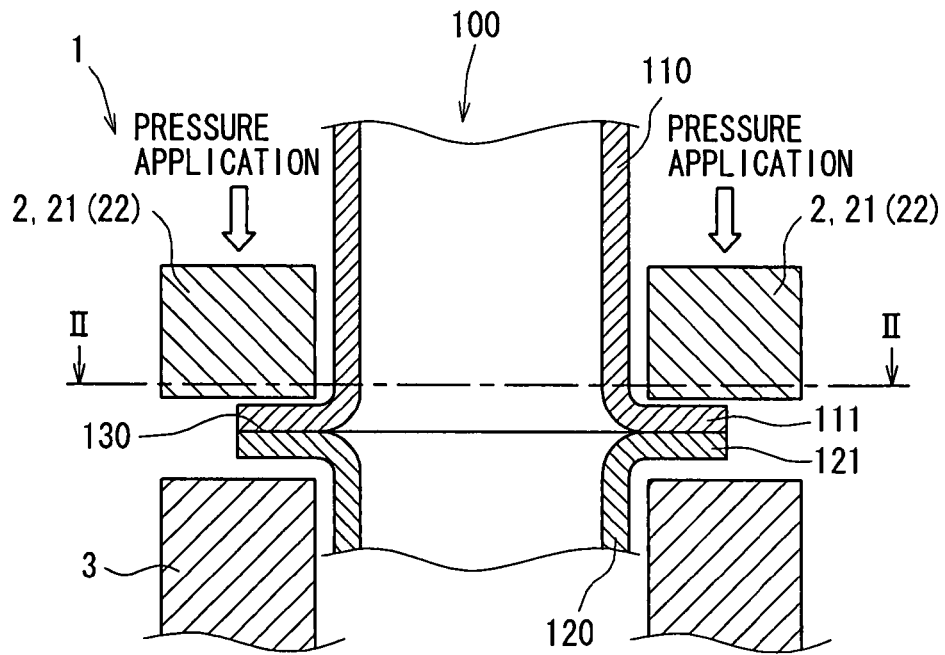
FIG. 1 is a schematic sectional view showing an ultrasonic welding device according to a first embodiment of the present invention.

A first embodiment of the present invention will be described with reference to FIGS. 1-7. In this case, an ultrasonic welding device 1 and an ultrasonic welding method are provided to manufacture a pipe 100 by joining a first member 110 (e.g., pipe member) and a second member 120 (e.g., pipe member) to each other at a joining surface 130.

Figure 3:
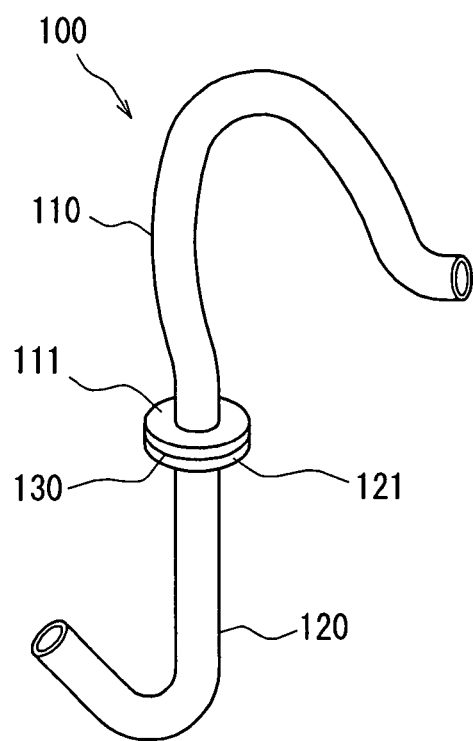
FIG. 3 is a perspective view showing a joined pipe which is joined by ultrasound according to the first embodiment.

As shown in FIG. 1, the first pipe member 110 which can be made of a metal has a first flange portion 111 (having a substantially circular shape) which is arranged at one end of the first pipe member 110 and extends to the whole circumference of the end. As shown in FIG. 3, the first pipe member 110 can have a bent portion which is arranged at the other end thereof (which is opposite to the side of first flange portion 111). That is, the other end of the first pipe member 110 can be constructed to be a bent pipe.

The second pipe member 120 which can be made of a metal has a second flange portion 121 (having a substantially circular shape) which is arranged at one end thereof and extends to the whole circumference of the end. The second flange portion 121 corresponds to an end portion around a hole (i.e., passage) defined in the second pipe member 120.

As shown in FIG. 3, the second pipe member 120 can have a bent portion which is arranged at the other end thereof (which is opposite to the side of second flange portion 121). That is, the other end of the second pipe member 120 is constructed to be a bent pipe.

The ultrasonic welding device 1 has a horn unit 2, and an anvil 3 for fixing the second pipe member 120. A pressure (with direction corresponding to arrow direction in FIG. 1, for example) is applied to the first pipe member 110 through the horn unit 2 toward the side of the second pipe member 120. The first pipe member 110 is excited to have a vibration in an extending direction of the surface of the first flange portion 111.

Figure 2:
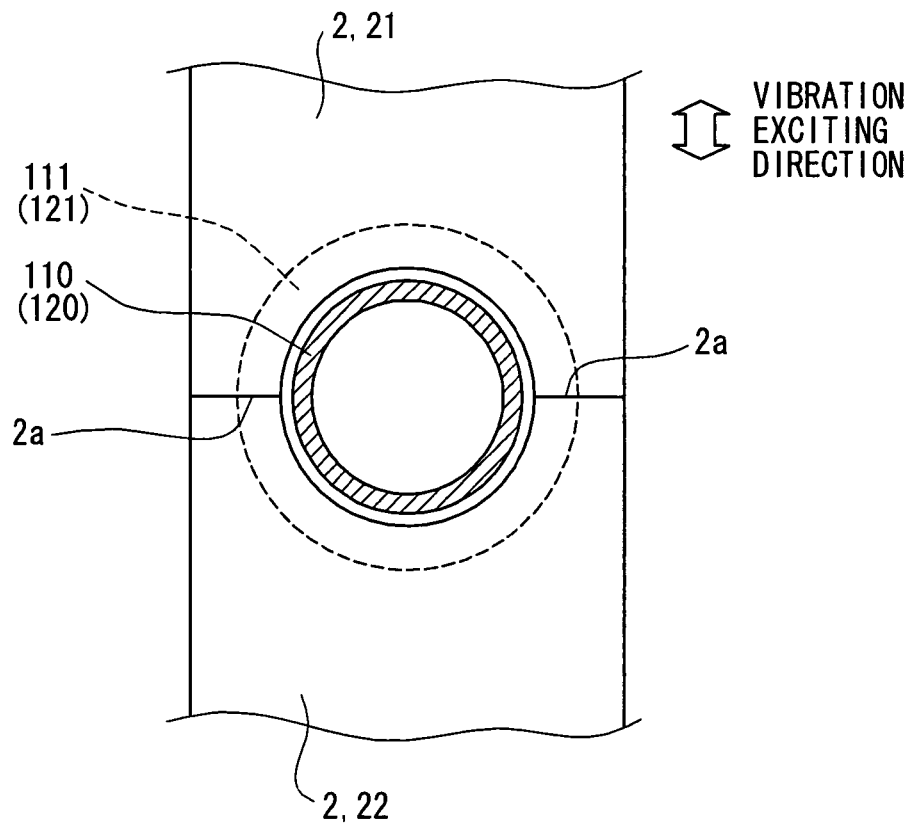
FIG. 2 is partially sectional view taken along a line II-II in FIG. 1.

As shown in FIG. 2, the horn unit 2 is constructed of multiple division portions, which are separate from each other in a circumferential direction of the first flange portion 111 at division surfaces 2a thereof and arranged along the circumference of the first flange portion 111. For example, the horn unit 2 can have a first horn member 21 and a second horn member 22, which are arranged along the circumference of the first flange portion 111 so that each of the first horn member 21 and the second horn member 22 has a substantially semicircular concave portion at the division side.

That is, the first pipe member 110 is surrounded by the first horn member 21 and the second horn member 22. The first horn member 21 and the second horn member 22 are separate from each other and face each other, at the division surface 2a of the first horn member 21 and the division surface 2a of the second horn member 22.

As shown in FIG. 2, each of the division surfaces 2a of the first horn member 21 and the second horn member 22 has two parts which sandwich the first pipe member 110 therebewteen. That is, the division line for dividing the horn unit 2 into the first horn member 21 and the second horn member 22 is substantially linear, and the two parts of the division line are opposite to each other with the first pipe member 110 being arranged therebewteen.

Figure 4A:
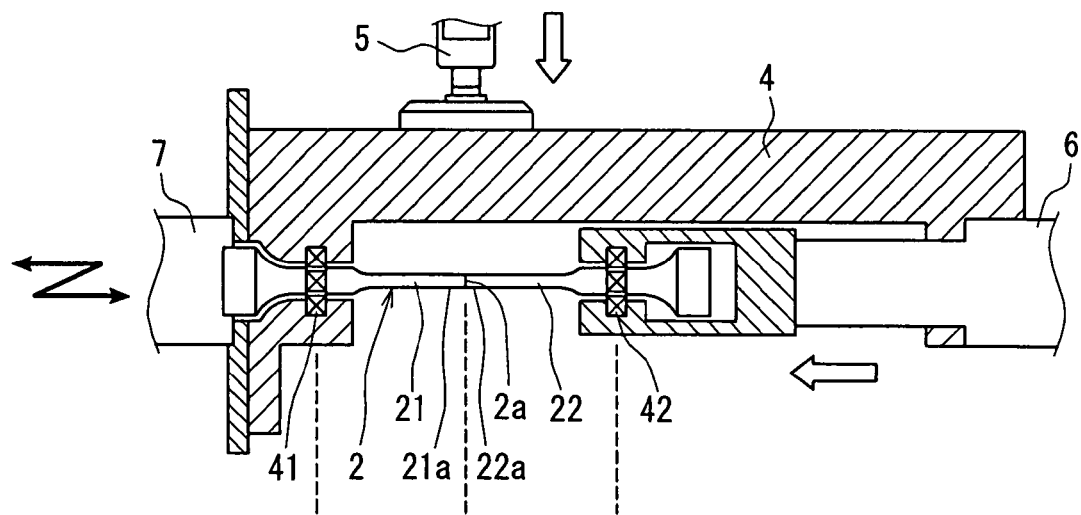
FIG. 4A is a partially sectional front view showing the ultrasonic welding device according to the first embodiment.

With reference to FIG. 4A which is a schematically partially sectional front view showing the ultrasonic welding device 1, the first horn member 21 is connected with an oscillator 7 (vibration exciting unit). The second horn member 22 is connected with a butt-load biasing portion 6 for butting the second horn member 22 with the first horn member 21.

The butt-load biasing portion 6 is provided to advance/retreat the second horn member 22 with respect to the first horn member 21, so that the second horn member 22 is butted with the first horn member 21. Thus, the first horn member 21 and the second horn member 22 can be pressed against each other at the division surfaces 2a.

With reference to FIG. 6, a convex portion 211 is provided for the first horn member 21 at the division surface 2a thereof, and a concave portion 221 which has a shape corresponding to the convex portion 211 is provided for the second horn member 22 at the division surface 2a thereof. The convex portion 211 and the concave portion 221 will be described later together with the joining method.

With reference to FIG. 4A, the first horn member 21 and the second horn member 22 are attached to a common bracket 4. The first horn member 21 and the second horn member 22 can be moved to the side (i.e., lower side in FIG. 4A) of the anvil 3 (which is omitted in FIG. 4A) by a joining-load biasing portion 5, which is connected with the bracket 4 to apply a pressure (pressurize) to the joining part between the first pipe member 110 and the second pipe member 120.

The first horn member 21 is held (supported) by the bracket 4 through a first holding portion 41. The second horn member 22 is held (supported) by the bracket 4 (with which the butt-load biasing portion 6 is connected) through a second holding portion 42.

Figure 4B:
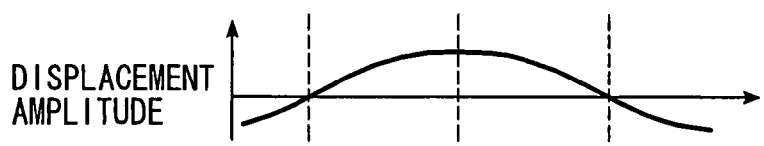
FIG. 4B is a graph showing a vibration amplitude of a horn unit displacement according to the first embodiment.

As shown in FIG. 4A, when the oscillator 7 excites the first horn member 21 to have a longitudinal vibration (i.e., vibration in extending direction of joining surface 130) in such a state that the first horn member 21 and the second horn member 22 have been pressed against each other at the division surfaces 2a thereof, the first horn member 21 will vibrate (resonate) at ½ wavelength of sound wave as shown in FIG. 4B. Moreover, the vibration is transferred to the second horn member 22 through the division surface 2a so that the second horn member 22 resonante at ½ wavelength of sound wave.

That is, a vibration system of the horn unit 2 which is constructed of the first horn member 21 and the second horn member 22 vibrates (resonate) at a wavelength of sound wave. In this case, the first horn member 21 is a vibration-exciting horn which is directly excited by the oscillator 7. The second horn member 22 is excited by the first horn member 21 to be capable of resonating, to be called a resonance horn.

As shown in FIG. 4B, the displacement amplitude when the first horn member 21 and the second horn member 22 vibrate has a minimum value at the position (shown in FIG. 4A) where the first holding portion 41 and the second holding portion 42 are arranged, so that the first holding portion 41 and the second holding portion 42 do not hamper the vibration of the first horn member 21 and the second horn member 22. The position where the displacement amplitude has the minimum value is called a node point, that is, a vibration node.

Moreover, as shown in FIG. 4B, the displacement amplitude when the first horn member 21 and the second horn member 22 vibrate has a maximum value at the position (shown in FIG. 4A) of the division surface 2a, so that the vibration of the first horn member 21 can be readily transferred to the second horn member 22 through the division surface 2a. The position where the displacement amplitude has the maximum value is called a vibration antinode.

In this case, multiple protrusions (not shown) are arranged at pressure-applying surfaces 21a and 22a of the first horn member 21 and the second horn member 22, which are at the side of the first flange portion 111 (i.e., lower side in FIG. 1) to contact the first flange portion 111 when the pressure is applied thereto.

Next, the ultrasonic welding method using the ultrasonic welding device 1 will be described.

Figure 5A:
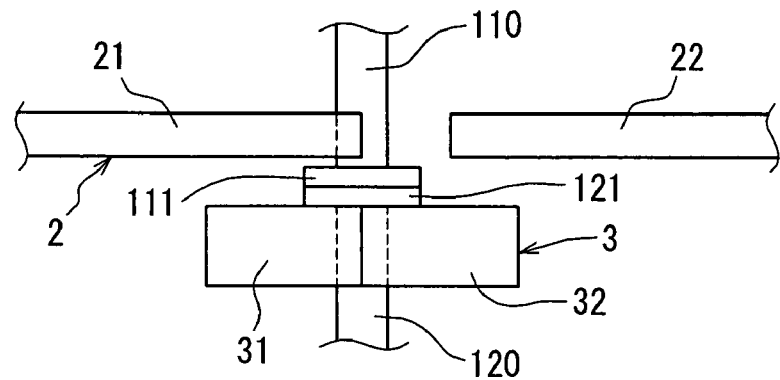
FIGS. 5A, 5B and 5C are schematic front views which respectively show different processes of the ultrasonic welding device according to the first embodiment.

At first, as shown in FIG. 5A, the second pipe member 120 is arranged at the anvil 3 with the second flange portion 121 faces the upper side, in such a state that the space between the first horn member 21 and the second horn member 22 is open in the circumferential direction.

The anvil 3 includes two portions (i.e., first anvil portion 31 and second anvil portion 32) which are separate from each other and arranged along the circumference of the second flange portion 121. Thus, the second pipe member 120 can be mounted to the anvil 3. Moreover, the first pipe member 110 is arranged in such a manner that the first flange portion 111 is disposed at the upper side surface of the second flange portion 121.

Figure 5B:
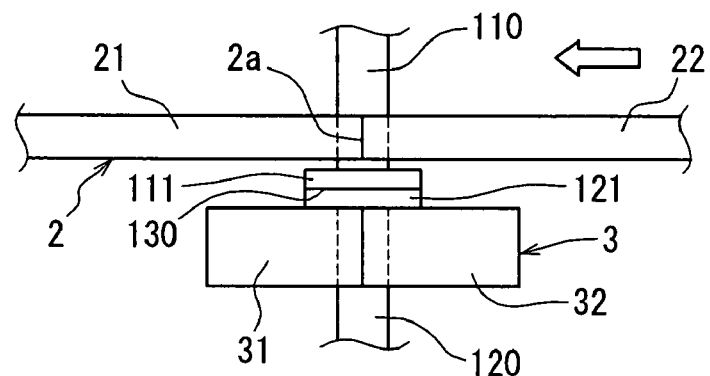

Next, as shown in FIG. 5B, the first horn member 21 and the second horn member 22 approach each other to surround the first pipe member 110 (that is, gap between first horn member 21 and second horn member 22 is closed in the circumferential direction), so that the first horn member 21 and the second horn member 22 are pressed against each other at the division surfaces 2a thereof.

As shown in FIG. 2, the concave portions of the first horn member 21 and the second horn member 22 are provided, so that the first horn member 21 and the second horn member 22 do not contact the outer surface of the first pipe member 110 due to the vibration (described later).

Figure 6A:
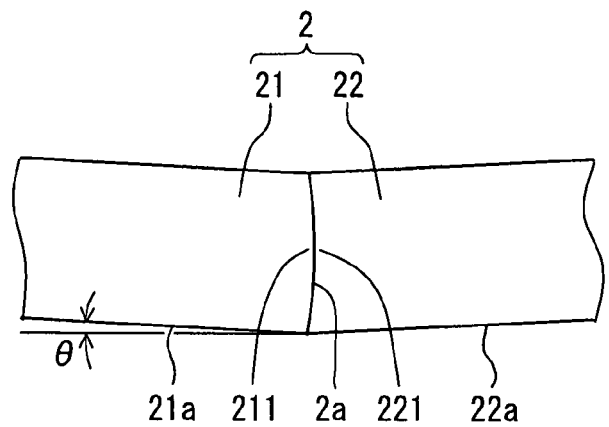
FIGS. 6A and 6B are schematic enlarged front views which respectively show the different processes of the ultrasonic welding device according to the first embodiment.

In the process shown in FIG. 5B and FIG. 6A which is an enlarged view, the horn member 21, 22 is slantways arranged, in such a manner that the part of the pressure-applying surface 21a, 22a which is nearer to the division surface 2a becomes nearer to the joining surface 130.

As shown in FIG. 6A, the convex portion 211 can be provided at the side of the division surface 2a of the first horn member 21, and extend to the whole division surface 2a. The convex portion 211 is a protrusion having a substantially arc-shaped cross section, and extends in a direction (i.e., front-back direction of paper) which is perpendicular to the direction of a pressure-applying reaction force (joining reaction force) applied to the horn unit 2.

On the other hand, the concave portion 221 can be provided at the side of the division surface 2a of the second horn member 22, and extend to the whole division surface 2a to correspond to the convex portion 211. In this case, the concave portion 221 has a substantially arc-shaped cross section, and extends in a direction which is perpendicular to the direction (i.e., front-back direction of paper) of the pressure-applying reaction force applied to the horn unit 2.

Figure 7:
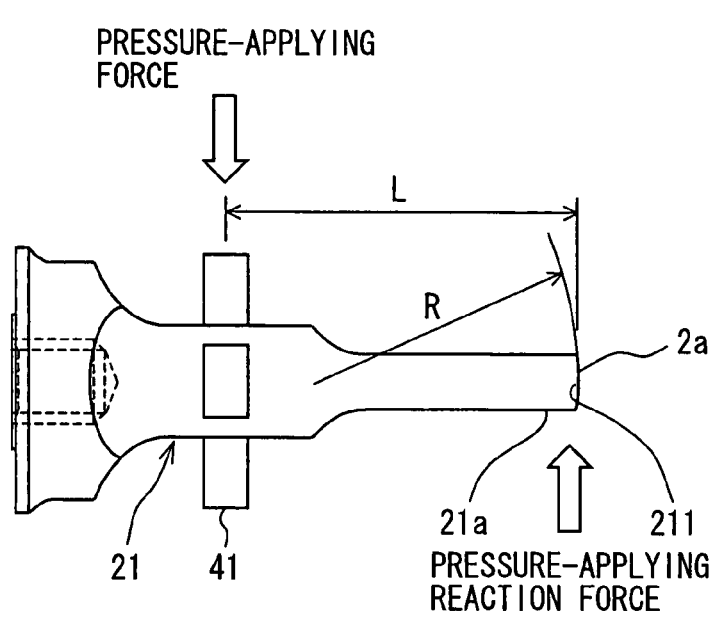
FIG. 7 is a schematic view showing a first horn member according to the first embodiment.

With reference to FIG. 7 which shows the first horn member 21, the curvature radius R of the convex portion 211 of the division surface 2a of the tip side (protruding side) is set substantially in a range from 0.5 L to L with respect to the distance L from the first holding portion 41 of the first horn member 21 to the division surface 2a thereof.

The curve surface of the tip portion of the convex portion 211 is provided with a curvature along a deformation locus, which is taken by the tip portion (division surface 2a) when the pressure-applying reaction force is biased at the periphery of the division surface 2a in the process described later so that the first horn member 21 is bent (deformed). The curvature radius R can be suitably set corresponding to the construction related to the deformation state of the first horn member 21.

The slant angle θ (with respect to upper surface of first flange portion 111, for example) of the pressure-applying surface 21a, 22a of the first horn member 21, 22 can be set substantially in a range from 0.05° to 1°. In this case, the minimum load capable of joining the first flange portion 111 and the second flange portion 121 is about 750N per one horn, the bent amount of the tip portion when the pressure-applying reaction force is applied is about 50 μm, and the curvature radius R of the convex portion 211 is about 60 mm. Thus, the slant angle θ is larger than or equal to 0.05°.

Because the slant angle θ is set corresponding to the pressure-applying reaction force (equal to pressurization force), the maximum value thereof is determined according to the maximum pressurization force.

Figure 5C:
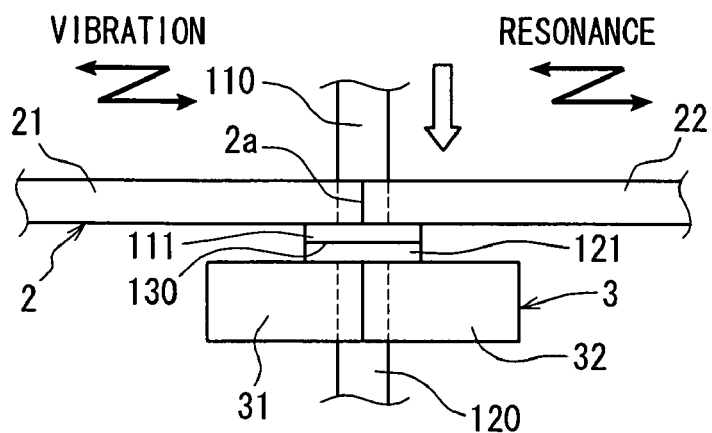

After the process shown in FIG. 5B is performed, the pressure-applying surface 21a and the pressure-applying surface 22a of the first horn member 21 and the second horn member 22 are pressurized to contact the first flange portion 111 as shown in FIG. 5C. Thus, the tips of the multiple protrusions (not shown) are engaged in the surface of the first flange portion 111, and the first horn member 21 is vibration-excited by the oscillator 7 (referring to FIG. 4). The vibration of the first horn member 21 is transferred to the second horn member 22 through the division surfaces 2a thereof, so that the second horn member 22 can resonate.

Figure 6B:
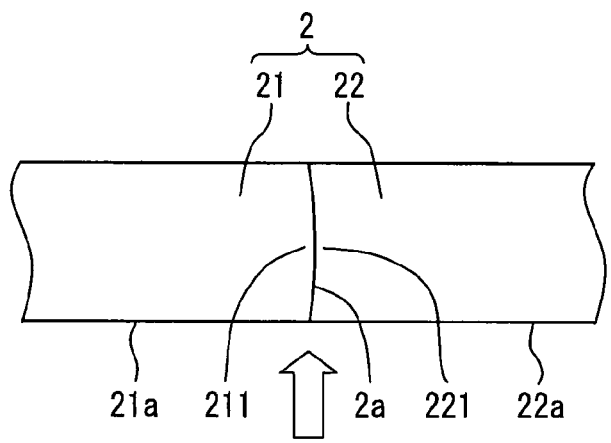

In the process shown in FIG. 5C, the pressure-applying surface 21a and the pressure-applying surface 22a of the first horn member 21 and the second horn member 22 are substantially parallel to the joining surface 130 (referring to FIG. 5C) due to the pressure-applying reaction force from the first flange portion 111 as shown in FIG. 6B. Thus, the pressure-applying surface 21a and the pressure-applying surface 22a can substantially uniformly press the first flange portion 111 over the substantially whole region thereof.

In this case, from the process shown in FIG. 6A to the process shown in FIG. 6B, the state that the convex portion 211 and the concave portion 221 tightly contact each other is maintained. Therefore, in the process shown in FIG. 5C, the vibration of the first horn member 21 can be substantially transferred to the second horn member 22 through the division surfaces 2a where the convex portion 211 and the concave portion 221 tightly contact each other.

As shown in FIG. 5C, when the first horn member 21 and the second horn member 22 are integrally vibration-excited, the first flange portion 111 will vibrate together with the first horn member 21 and the second horn member 22. Thus, the oxidation film and the like at the joining surface 130 between the flange portions 111 and 121 are substantially removed due to friction, so that emerging surfaces which are clean are pressed against each other. Thus, the first flange portion 111 and the second flange portion 121 are joined to each other at the joining surface 130.

As shown in FIG. 4B, the division surface 2a of the horn member 21, 22 is in the position where the displacement amplitude has the substantially maximum value when the first horn member 21 and the second horn member 22 vibrate. Thus, not only the vibration can be substantially transferred from the first horn member 21 to the second horn member 22, but also the first flange portion 111 can be substantially vibration-excited at the division surface 2a and the vicinity thereof. Therefore, the first flange portion 111 and the second flange portion 121 can be substantially joined to each other at the joining surface 130. Then, the manufacture of the pipe 100 can be finished.

In this case, the process shown in FIG. 5B and FIG. 6A corresponds to an arranging process. The process shown in FIG. 5C and FIG. 6B corresponds to a joining process.

According to this embodiment, in the arranging process, the first horn member 21 and the second horn member 22 are beforehand slantways arranged with taking the deformation in the joining process into consideration, in such a manner that the part of the pressure-applying surface 21a, 22a which is nearer to the division surface 2a becomes nearer to the joining surface 130. Thus, when the pressure-applying reaction force is applied to the first horn member 21 and the second horn member 22 in the joining process, the pressure-applying surface 21a and the pressure-applying surface 22a can be made substantially parallel to the joining surface 130 due to the pressure-applying reaction force. Therefore, the first flange portion 111 can be substantially uniformly pressurized and vibration-excited.

Moreover, in the joining process, the first horn member 21 and the second horn member 22 can be pressed against each other at the division surface 2a, and the vibration can be efficiently transferred through the division surfaces 2a of the first horn member 21 and the second horn member 22. Therefore, abrasion and burn of the horn unit 2 at the division surfaces 2a can be restricted.

Moreover, from the arranging process to the joining process, the engagement state that the convex portion 211 and the concave portion 221 formed at the division surfaces 2a tightly contact each other is maintained. Thus, the first horn member 21 and the second horn member 22 can be substantially pressed against each other at the division surface 2a in the joining process. Thus, the vibration can be efficiently transferred through the division surfaces 2a.

The convex portion 211 of the first horn member 21 and the concave portion 221 of the second horn member 22 have the substantially arc-shaped cross section, and extend in the direction which is perpendicular to the direction of the pressure-applying reaction force. Therefore, from the arranging process to the joining process, the state that the convex portion 211 and the concave portion 221 tightly contact each other can be readily maintained.

The convex portion 211 and the concave portion 221 are respectively provided for the first horn member 21 and the second horn member 22 over the whole division surfaces 2a. Thus, the pressing area between the first horn member 21 and the second horn member 22 can be readily maintained. Therefore, the first horn member 21 and the second horn member 22 can be readily integrally vibration-excited.

Accordingly, a stable joining performance at the joining surface 130 can be obtained by the ultrasonic welding device 100.

Second Embodiment

A second embodiment of the present invention will be described with reference to FIG. 8.

According to the second embodiment, the arrangements of the convex portion 211 and the concave portion 221 at the division surfaces 2a are different from those of the above-described first embodiment.

Figure 8:
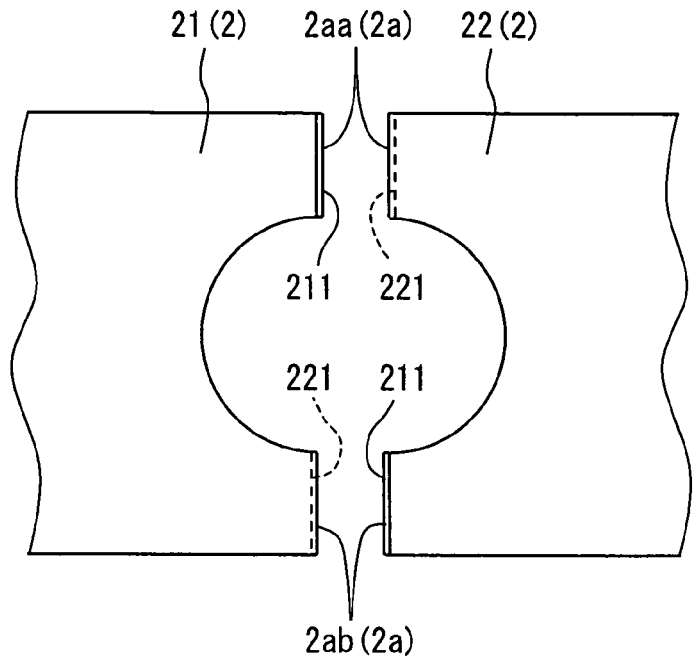
FIG. 8 is a schematic plan view showing a horn unit according to a second embodiment of the present invention.

As shown in FIG. 8 which is a plan view showing the horn unit 2, each of the division surfaces 2a of the first horn member 21 and the second horn member 22 has the two portions 2aa and 2ab which are positioned symmetrically with respect to the first pipe member 110 sandwiched therebetween. That is, the two portions 2aa and 2ab are arranged substantially in line in the diameter direction of the first pipe member 110.

In this case, the first horn member 21 is provide with the convex portion 211 at the one portion 2aa (at upper side in FIG. 8) of the division surface 2a of the first horn member 21, and the second horn member 22 is provide with the concave portion 221t the one portion 2aa (at upper side in FIG. 8) of the division surface 2a of the second horn member 22.

On the other hand, the second horn member 22 is provided with the convex portion 211 at the other portion 2ab (at lower side in FIG. 8) of the division surface 2a of the second horn member 22, and the first horn member 21 is provided with the concave portion 221 at the other portion 2ab (at lower side in FIG. 8) of the division surface 2a of the first horn member 21. The convex portions 211 at the two portions 2aa and 2ab of the division surface 2a have a same shape, and the concave portions 221 at the two portions 2aa and 2ab of the division surface 2a have a same shape. Thus, the first horn member 21 and the second horn member 22 can be provided with the same shape, to be permitted commonality by one kind of horn.

Third Embodiment

A third embodiment of the present invention will be described with reference to FIGS. 9A and 9B which are front views showing the horn unit 2.

According to the third embodiment, the shapes of the concave portion 221 and the convex portion 211 of the division surfaces 2a are different from those of the first embodiment.

Figure 9A:
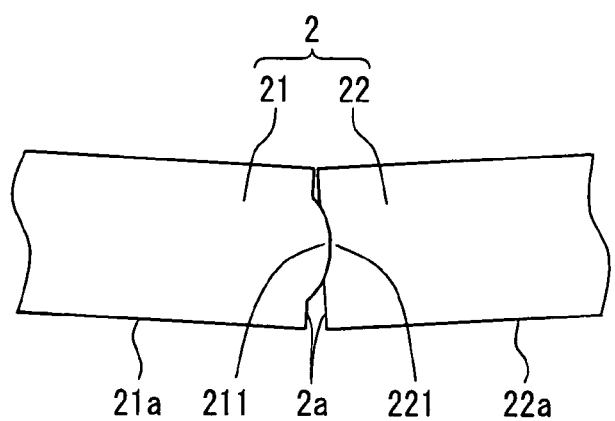
FIGS. 9A and 9B are schematic enlarged front views which respectively show different processes of an ultrasonic welding device according to a third embodiment of the present invention.
Figure 9B:
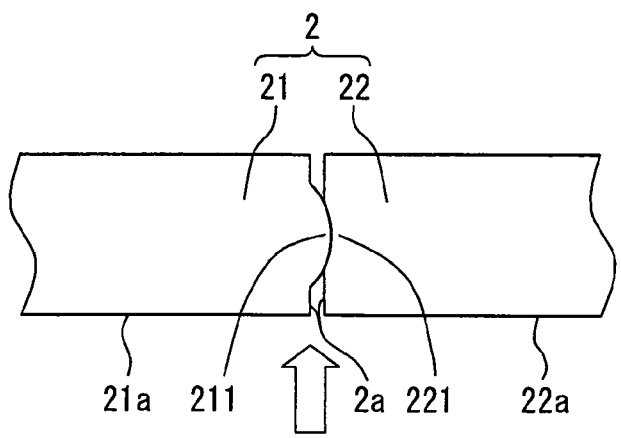

As shown in FIGS. 9A and 9B, at the division surface 2a, the first horn member 21 has the convex portion 211 which has arc-shaped cross section and extends in the direction perpendicular to the direction of the pressure-applying reaction force. Moreover, at the division surface 2a, the second horn member 22 has the concave portion 221 which has arc-shaped cross section and extends in the direction perpendicular to the direction of the pressure-applying reaction force. The concave portion 221 is shaped and positioned corresponding to the convex portion 211.

The first horn member 21 is provided with the convex portion 211 at one part (e.g., substantially middle portion of up-down direction in FIGS. 9A and 9B) of the division surface 2a of the first horn member 21, and the second horn member 22 is provided with the concave portion 221 at one part of the division surface 2a of the second horn member 22. Thus, the first horn member 21 and the second horn member 22 are spaced from each other (without interference to each other) at the other part (where the convex portion 211 and the concave portion 221 are not arranged) of the division surface 2a, from the arranging process shown in FIG. 9A and the joining process shown in FIG. 9B.

Accordingly, in the case where the first horn member 21 and the second horn member 22 contact each other at the division surfaces 2a, the damage to the ends of the division surface 2a (i.e., corner portions of up-down direction in FIGS. 9A and 9B) can be restricted. Moreover, in the case where foreign matter is sandwiched between the division surfaces 2a of the first horn member 21 and the second horn member 22, the foreign matter can be readily taken out from the other part of the division surface 2a where the first horn member 21 and the second horn member 22 are spaced from each other.

Fourth Embodiment

A fourth embodiment of the present invention will be described with reference to FIGS. 10A and 10B which are front views showing the horn unit 2.

According to the fourth embodiment, the shapes of the concave portion 221 and the convex portion 211 at the division surfaces 2a are different from those of the first embodiment and the third embodiment.

Figure 10A:
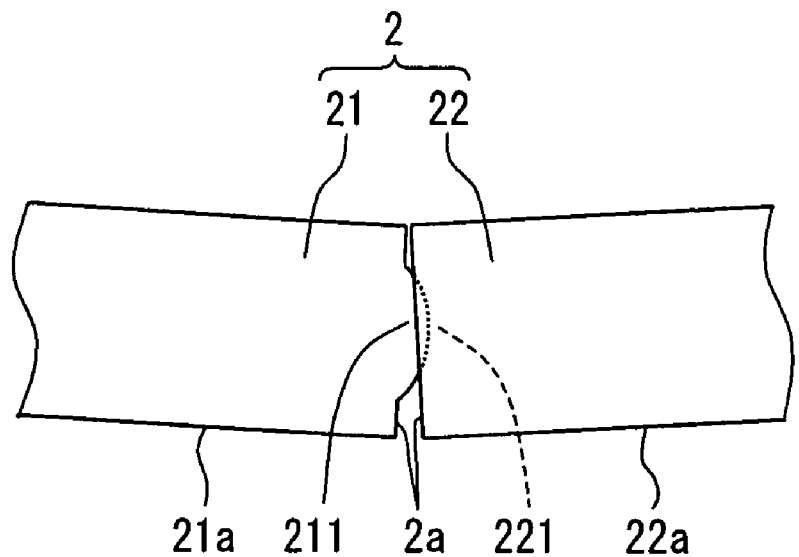
FIGS. 10A and 10B are schematic enlarged front views which respectively show different processes of an ultrasonic welding device according to a fourth embodiment of the present invention.
Figure 10B:
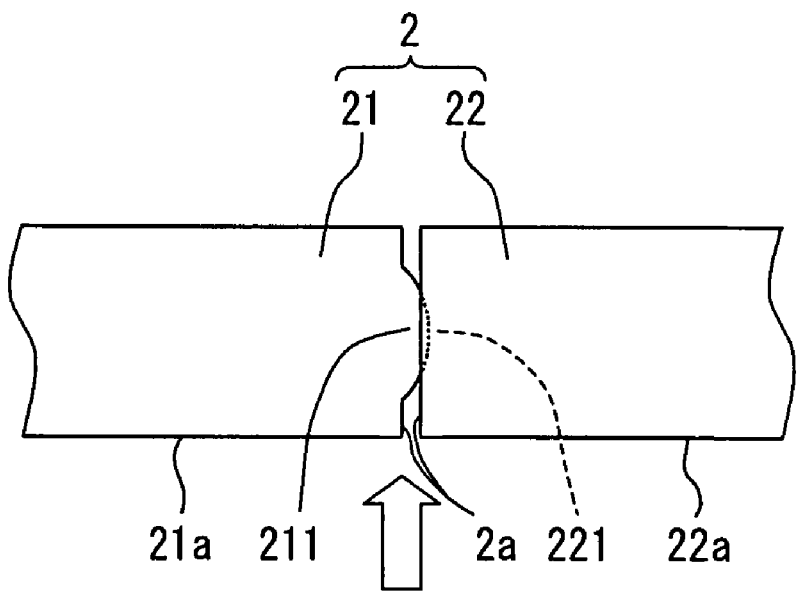

As shown in FIGS. 10A and 10B, one part (e.g., substantial middle portion of up-down direction in FIGS. 10A and 10B) of the division surface 2a of the first horn member 21 is provided with the convex portion 211 which has a substantially spherical shape. Moreover, one part (e.g., substantial middle portion of up-down direction in FIGS. 10A and 10B) of the division surface 2a of the second horn member 22 is provided with the concave portion 221 which has a substantially spherical shape to correspond to the convex portion 211.

In this case, other part of the division surface 2a of the first horn member 21 and other part of the second horn member 22 where the convex portion 211 and 221 are not arranged are spaced from each other (without interference to each other) from the arranging process shown in FIG. 10A to the joining process shown in FIG. 10B.

Accordingly, in the case where the first horn member 21 and the second horn member 22 contact each other at the division surfaces 2a, the damage to the ends of the division surface 2a (i.e., corner portions of up-down direction in FIGS. 10A and 10) can be restricted. Moreover, in the case where foreign matter is sandwiched between the division surfaces 2a of the first horn member 21 and the second horn member 22, the foreign matter can be readily taken out from the other part of the division surface 2a where the first horn member 21 and the second horn member 22 are spaced from each other.

In this case, the division surface 2a of the first horn member 21 and the division surface 2a of the second horn member 22 can be respectively provided with the one convex portion 211 and the one concave portion 221. Thus, in the case where the first horn member 21 and the second horn member 22 are bent in the pressure-applying reaction force direction, the division surface 2a of the first horn member 21 and the division surface 2a of the second horn member 22 can tightly contact each other. Moreover, even in the case where the first horn member 21 and the second horn member 22 are bent in the direction perpendicular to the pressure-applying reaction force direction (that is, the case where first horn member 21 and second horn member 22 are bent to be spaced from each other at division surface 2a), the division surface 2a of the first horn member 21 and the division surface 2a of the second horn member 22 can tightly contact each other.

Alternatively, the division surface 2a of the first horn member 21 and the division surface 2a of the second horn member 22 can be respectively provided with the multiple convex portions 211 and the multiple concave portions 221 which are rowed in the direction perpendicular to the pressure-applying reaction force direction. In this case, the pressing area between the division surfaces 2a of the first horn member 21 and the second horn member 22 can be readily maintained.

Fifth Embodiment

A fifth embodiment of the present invention will be described, with reference to FIG. 11A which is a plan view showing the horn unit 2 and FIG. 11B which is a front view showing the horn unit 2 in FIG. 11A.

According to the fifth embodiment, a soft portion 223 (i.e., sacrifice wear member) is arranged in the division surface 2a of the horn member 21 or 22.

Figure 11A:
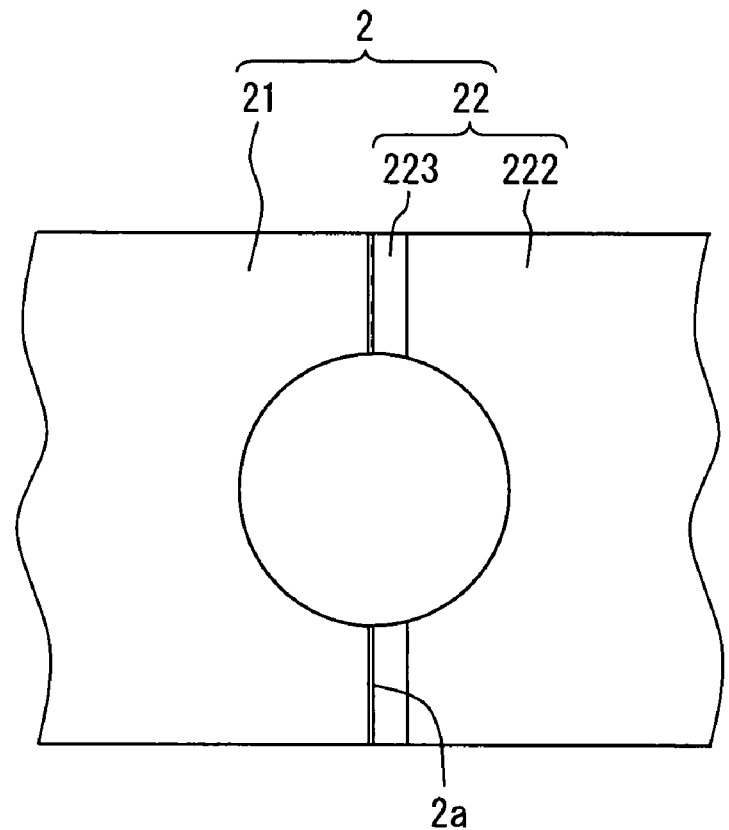
FIG. 11A is a schematic plan view showing a horn unit according to a fifth embodiment of the present invention.
Figure 11B:
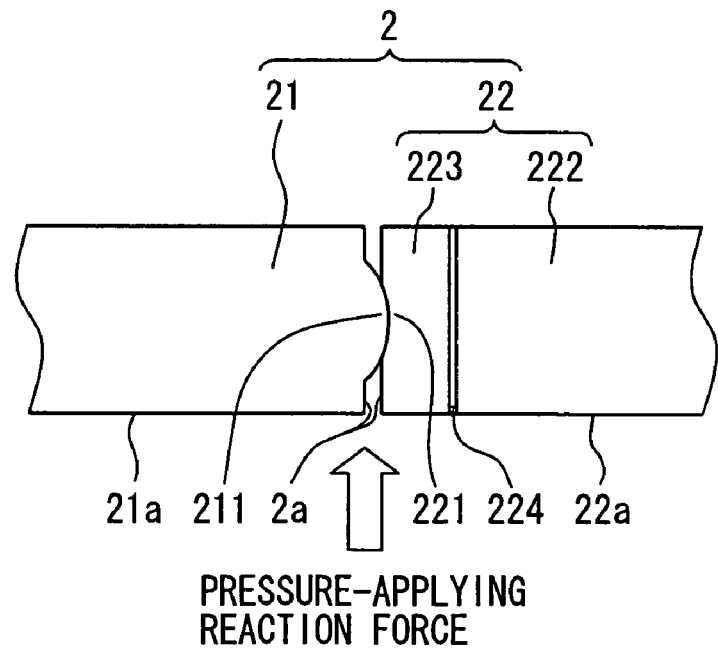
FIG. 11B is a schematic front view showing the horn unit in FIG. 11A.

As shown in FIGS. 11A and 11B, the second horn member 22 is constructed of a body portion 222 and the soft portion 223 (soft vibration-transferring member) which is arranged at an end (of vibration exiting direction) of the body portion 222. The end is positioned at the side of the first horn member 21. In this case, the division surface 2a of the second horn member 22 is constructed of an end surface of the soft portion 223 which faces the first horn member 21.

The soft portion 223 is made of a material having a lower hardness than that of the body portion 222, and fixed to the body portion 222, for example, by bonding through a wax 224 with reference to FIG. 11B. In this case, the soft portion 223 can be provided with the concave portion 221 corresponding to the convex portion 211 of the first horn member 21.

It is desirable that the material of the soft portion 223 has not only the lower hardness than the body portion 222, but also a substantially same coefficient of elasticity as the body portion 222. Because the material of the soft portion 223 has the substantially same coefficient of elasticity as the body portion 222, the vibration of the first horn member 21 can be substantially transferred to the second horn member 22.

Thus, when the vibration of the first horn member 21 is transferred to the second horn member 22 through the division surfaces 2a to make the second horn member 22 resonate in the joining process, the soft portion 223 is selectively worn in the case where wear occurs at the division surface 2a. Therefore, the wear of the first horn member 21, the body portion 222 of the second horn member 22 can be restricted.

In this case, the soft portion 223 is bonded to the body portion 222 through the wax to be detachable. Therefore, in the case where the soft portion 223 is worn, it is only necessary to replace the soft portion 223, thus simplifying the repair.

Alternatively, the soft portion 223 can be also fixed to the body portion 222 by other adhesive other than wax, if the soft portion 223 can be detachably mounted to the body portion 222.

Sixth Embodiment

A sixth embodiment of the present invention will be described with reference to FIG. 12 which is a front view showing the horn unit 2.

According to the sixth embodiment, the fixing construction of the soft portion 223 to the body portion 222 is different from that of the above-described fifth embodiment.

Figure 12:
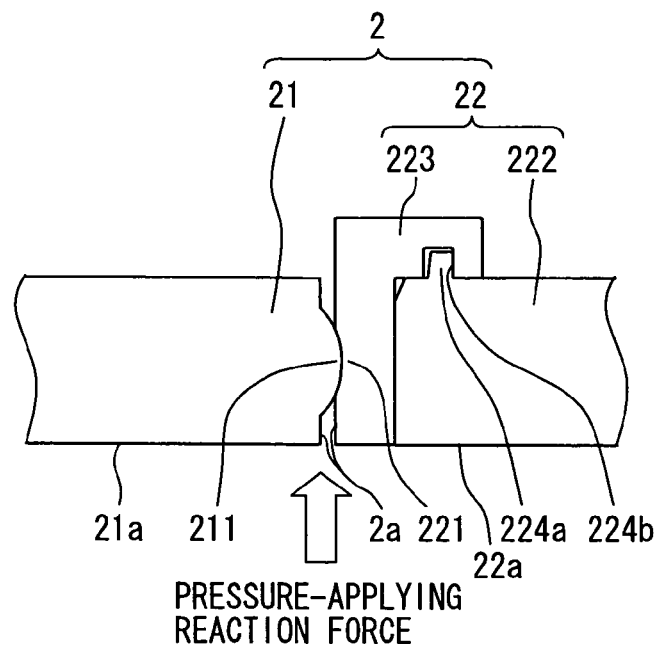
FIG. 12 is a schematic front view showing a horn unit according to a sixth embodiment of the present invention.

As shown in FIG. 12, the second horn member 22 is constructed of the body portion 222 and the soft portion 223 (soft vibration-transferring member) which is arranged at the end (of vibration exiting direction) of the body portion 222. The end is positioned at the side of the first horn member 21. In this case, the division surface 2a of the second horn member 22 is constructed of the end surface of the soft portion 223 which faces the first horn member 21. The soft portion 223 is made of a material having a lower hardness than that of the body portion 222.

An engagement protrusion portion 224a and an engagement groove portion 224b are respectively arranged at the body portion 222 and the soft portion 223, and engaged with each other. Thus, the soft portion 223 is mechanically engaged with (fixed to) the body portion 222. Moreover, the soft portion 223 is provided with the concave portion 221 corresponding to the convex portion 211 of the first horn member 21.

The soft portion 223 has a similar performance with that of the fifth embodiment, to construct the soft vibration-transferring member.

According to the sixth embodiment, when the vibration of the first horn member 21 is transferred to the second horn member 22 through the division surfaces 2a to make the second horn member 22 resonate in the joining process, the soft portion 223 is selectively worn in the case where wear occurs at the division surface 2a. Therefore, the wear of the first horn member 21, the body portion 222 of the second horn member 22 can be restricted.

In this case, the soft portion 223 is engaged with the body portion 222 through the engagement protrusion portion 224a and an engagement groove portion 224b, to be detachably mounted. Therefore, in the case where the soft portion 223 is worn, it is only necessary to replace the soft portion 223, thus simplifying the repair.

In this case, the fixing of the soft portion 223 to the body portion 222 is not limited to the above-described engagement construction. The body portion 222 can be detachably fixed to the body portion 222 by other fixing method.

OTHER EMBODIMENT

Although the present invention has been fully described in connection with the preferred embodiments thereof with reference to the accompanying drawings, it is to be noted that various changes and modifications will become apparent to those skilled in the art.

In the above-described embodiments, the convex portions 211, and the concave portions 221 are respectively arranged at the division surface 2a of the first horn member 21 and that of the second horn member 22 from the arranging process to the joining process. However, the concave portions and the convex portions for continuous engagement can be also omitted.

Figure 13A:
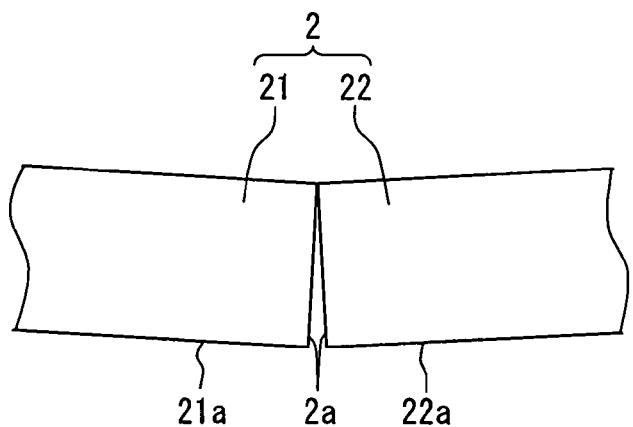
FIGS. 13A and 13B are schematic enlarged front views which respectively show different processes of an ultrasonic welding device according to a first modification of the present invention.
Figure 13B:
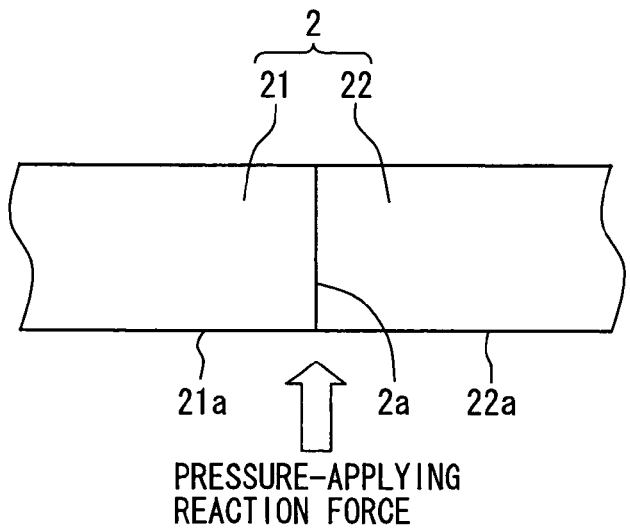

For example, as shown in FIGS. 13A and 13B, each of the division surfaces 2a of the first horn member 21 and the second horn member 22 can have a substantial plane shape. With reference to FIG. 13A, in the arranging process, the first horn member 21 and the second horn member 22 are slantways arranged, in such a manner that the part of the pressure-applying surface 21a, 22a which is nearer to the division surface 2a becomes nearer to the joining surface 130 (referring to FIG. 1). With reference to FIG. 13B, in the joining process, the pressure-applying surface 21a and the pressure-applying surface 22a are made substantially parallel with the joining surface 130 due to the pressure-applying reaction force to make the division surfaces 2a tightly contact each other. More alternatively, the convex portion and the concave portion can be also arranged to tightly contact each other in the joining process, but not to tightly contact each other in the arranging process.

In the third-sixth embodiments, the convex portion 211 is arranged at the first horn member 21, and the concave portion 221 is arranged at the second horn member 22. However, the convex portion 211 can be also arranged at the second horn member 22, and the concave portion 221 can be also arranged at the first horn member 21.

In the fifth and sixth embodiments, the second horn member 22 is provided with the soft portion 223 which is detachably fixed to the body portion 222 of the second horn member 22. The end surface of the soft portion 223 at the side of the first horn member 21 constructs the division surface 2a. Alternatively, the second horn member 22 can be also integrally constructed of a soft vibration-transferring member which has the division surface 2a at the end surface thereof of the side of the first horn member 21. In this case, although the size of the soft vibration-transferring member increases, the number of the construction components of the horn unit 2 can be reduced.

Moreover, at least one of the first horn member 21 and the second horn member 22 can be provided with the soft vibration-transferring member which has the division surface 2a at the end surface thereof.

As described in the fifth and sixth embodiments, the second horn member 22 of the horn unit 2 is provided with the detachable soft portion 223. In the arranging process, the first horn member 21 and the second horn member 22 are slantways arranged, in such manner that the part of the pressure-applying surface 21a, 22a which is nearer to the division surface 2a becomes nearer to the joining surface 130. In the joining process, the pressure-applying surface 21a and the pressure-applying surface 22a is made substantially parallel to the joining surface 130 due to the pressure-applying reaction force. However, the construction where the soft vibration-transferring member is detachably arranged at the division surface 2a can be effectively used for the division surface 2a (butting portion) of the horn unit 2 which includes the two division portions 21 and 22, irrespective to, whether or not there is the slant in the arranging process.

Figure 14:
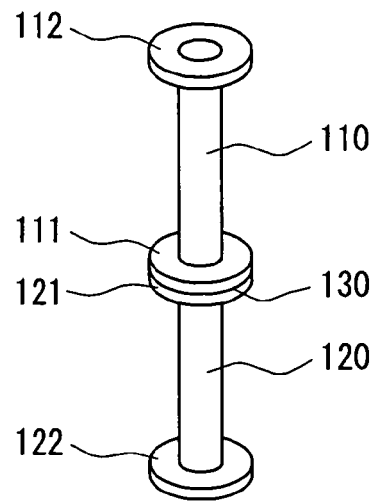
FIG. 14 is a schematic perspective view showing a joined pipe according to a second modification of the present invention.

In the above-described embodiments, the first pipe member 110 is provided with the bent portion. However, as shown in FIG. 14, the first pipe member 110 can be also provided with a flange portion 112 which is arranged at an opposite side of the flange portion 111 to construct a connection portion, or/and provided with an overhang portion which overhangs in the diametrical direction of a nut (not shown) or the like.

In the above-described embodiments, the horn unit 2 is constructed of the two horn members 21 and 22 which are separate from each other. However, the horn unit 2 can be also constructed of the multiple division horn members, the numbers of which is more than or equal to three. In this case, the division surface of the horn member can be provided with the construction according to the present invention.

Figure 15:
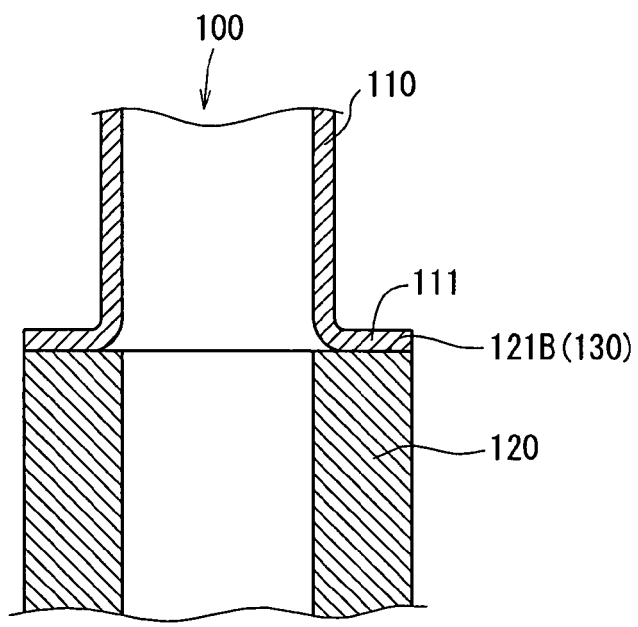
FIG. 15 is a schematic sectional view showing a joined pipe according to a third modification of the present invention.
Figure 16:
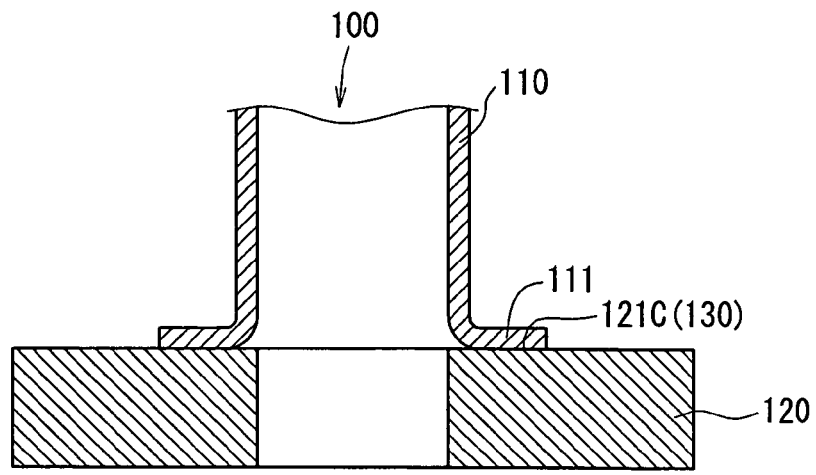
FIG. 16 is a schematic sectional view showing a joined pipe according to a fourth modification of the present invention.

Moreover, in the above-described embodiments, the second member 120 as the object member for joining has a substantially same construction as the first pipe member 110. However, the second member 120 can be also provided with a different construction with that of the first pipe member 110. For example, as shown in FIG. 15, the second member 120 can be a thick-walled member with a cross section 121B (perpendicular to axis direction of first pipe member 110) which has an area substantially equal to that of the above-described second flange portion 121. More alternatively, as shown in FIG. 16, the second member 120 can be also constructed of a block-shaped member which is joined to the first flange portion 111 of the first pipe member 110 at the end surface 121C thereof.

Such changes and modifications are to be understood as being in the scope of the present invention as defined by the appended claims.

What is claimed is:

1. An ultrasonic welding method comprising:
   an arranging process for arranging a horn unit at a side of a flange portion of a first member so that the horn unit and a second member are respectively positioned at two opposite sides of the flange portion, the flange portion being positioned at an end of the first member,
   the horn unit including a first horn member and a second horn member which are separate from each other in a circumferential direction of the flange portion at division surfaces of the first horn member and the second horn member;
   a moving process for moving the first horn member and the second horn member into contact with each other, and
   a joining process for vibration-exciting the flange portion while pressurizing the flange portion toward an end portion of the second member at pressure-applying surfaces of the first horn member and the second horn member so that the flange portion of the first member is joined to the end portion of the second member at a joining surface,
   the joining process being performed in such a state that the first horn member and the second horn member are pressed against each other at the division surfaces thereof, wherein:
   in the arranging process, each of the first horn member and the second horn member is slantways arranged in such a manner that a part of the pressure-applying surfaces thereof which is nearer to the division surfaces thereof is nearer to the joining surface; and
   in the joining process, the pressure-applying surfaces of the first horn member and the second horn member are disposed to be substantially parallel to the joining surface due to a pressure-applying reaction force, and a vibration of the first horn member is transferred to the second horn member through the division surfaces which are pressed against each other.

2. The ultrasonic welding method according to claim 1, wherein:

the first member has a substantial pipe shape;

the second member has a hole around which the end portion of the second member is joined to the first member; and in the joining process, the second horn member is capable of resonating due to the vibration from the first horn member.

3. The ultrasonic welding method according to claim 1, wherein:

in the arranging process, the horn unit which has at least one concave portion and at least one convex portion is arranged, one of the first horn member and the second horn member having the at least one convex portion at the division surfaces thereof, and the other of the first horn member and the second horn member having the at least one concave portion at the division surfaces thereof corresponding to the convex portion; and from the arranging process to the joining process, an engagement between the convex portion and the concave portion substantially continues.

4. The ultrasonic welding method according to claim 3, wherein the convex portion extends in a direction perpendicular to the pressure-applying reaction force, and has a substantially arc-shaped cross section.

5. The ultrasonic welding method according to claim 4, wherein the convex portion is arranged over the substantial whole of the division surfaces of the one of the first horn member and the second horn member.

6. The ultrasonic welding method according to claim 4, wherein the convex portion is arranged at one part of the division surfaces of the one of the first horn member and the second horn member, and the other part of the division surfaces is spaced from the other of the first horn member and the second horn member between the arranging process and the moving process.

7. The ultrasonic welding method according to claim 3, wherein the convex portion has a substantial spherical shape.

8. The ultrasonic welding method according to claim 7, wherein one of the first or second horn members has a plurality of convex portions arranged substantially in parallel in a direction perpendicular to the pressure-applying reaction force.

9. The ultrasonic welding method according to claim 3, wherein:

each of the division surfaces of the first horn member and the second horn member includes a first portion and a second portion, which are symmetrically positioned with respect to the first member sandwiched therebetween; and two convex portions are respectively arranged at the first portion of the division surface of the one of the first horn member and the second horn member and the second portion of the division surface of the other of the first horn member and the second horn member, the first portion of the division surface of the one of the first horn member and the second horn member and the second portion of the division surface of the other thereof being symmetrically positioned with respect to the first member sandwiched therebetween.

10. The ultrasonic welding method according to claim 1, wherein at least one of the first horn member and the second horn member includes a body portion and a soft portion which has a lower hardness than the body portion and is arranged at a side of the division surface thereof, the soft portion being detachably mounted to the body portion.

11. An ultrasonic welding method comprising:

an arranging process for arranging a horn unit at a side of a flange portion of a first member so that the horn unit and a second member are respectively positioned at two opposite sides of the flange portion, the flange portion being positioned at an end of the first member, the horn unit including a first horn member and a second horn member which are separate from each other in a circumferential direction of the flange portion at division surfaces of the first horn member and a second horn member;

a moving process for moving the first horn member and the second horn member into contact with each other, and a joining process for vibration-exciting the flange portion while pressurizing the flange portion toward an end portion of the second member at pressure-applying surfaces of the first horn member and the second horn member so that the flange portion of the first member is joined to the end portion of the second member at a joining surface, the joining process being performed in such a state that the first horn member and the second horn member are pressed against each other at the division surfaces thereof, wherein:

at least one of the first horn member and the second horn member of the horn unit includes a body portion and a soft portion which has a lower hardness than the body portion and is arranged at a side of the division surface thereof, the soft portion being detachably mounted to the body portion; and in the joining process, a vibration of the first horn member is transferred to the second horn member through the division surfaces which are pressed against each other.

12. The ultrasonic welding method according to claim 11, wherein:

the first member has a substantial pipe shape;

the second member has a hole around which the end portion thereof joined to the first member is arranged; and in the joining process, the second horn member is capable of resonating due to the vibration from the first horn member.

* * * * *